United States Patent Office 3,375,282
Patented Mar. 26, 1968

---

3,375,282
PROCESS OF PREPARING NITROSO-CARBORANE MONOMERS
Joel M. Kauffman, Lexington, Mass., and Joseph Green, Dover, and Marvin M. Fein, Westfield, N.J., assignors, by mesne assignments, to the United States of America as represented by the United States Atomic Energy Commission
No Drawing. Filed Aug. 5, 1965, Ser. No. 477,624
6 Claims. (Cl. 260—606.5)

This invention describes a novel and improved process for preparing nitrogen containing carborane derivatives.

More particularly, this invention concerns an improved process for preparing 1-nitrosocarborane and 1-loweralkyl-2-nitrosocarboranes.

The term "carboranyl" is the name given to the radical of the ortho carborane isomer shown below:

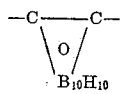

The ortho isomer is also referred to symbolically by the Greek letter Theta, abbreviated as $\theta$.

Loweralkyl as used herein includes alkyl groups having from 1 to 4 carbon atoms.

Nitrosocarborane and methylnitrosocarborane are intermediate for preparing thermally stable polymers. Such polymers have been found useful as binders in plastic bonded explosive compositions. Presently the compounds are prepared by the five step reaction exemplified by the preparation of methylnitrosocarborane.

(1) 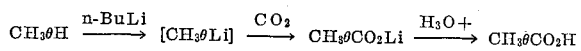
(2) 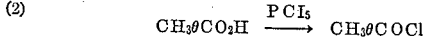
(3) 
(4) 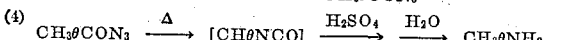
(5) 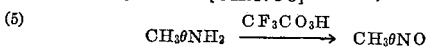

The above process suffers from several substantial disadvantages. For one thing, the process involves five separate steps requiring five isolations and an even larger number of manipulative steps. In addition, the prior art process cycle required at least 24 hours to produce a complete run. Further, the large number of steps involved make a scale-up to commercial quantities impractical. Finally, yields were poor; frequently under 15% of theory based on starting material. Because of the numerous shortcomings of the known preparative process, an improved method of preparing the two intermediates would be a substantial advance in the art. Ideally, an improved preparative process would require fewer manipulative steps, could be carried out in one vessel by inexperienced personnel within the duration of a working shift. An added advantage would be an increased yield of product free from deleterious contaminants, using available starting material.

It is an object of this invention generally to prepare methylnitrosocarborane and nitrosocarborane by a simplified process.

It is a more specific object of this invention to prepare the above products by a rapid, unique in situ process.

An additional object of this invention is the development of a novel preparative process for preparing the nitrosocarboranes of this invention in good yield and free from deleterious contaminants.

Other objects of this invention will in part be obvious and will in part appear hereinafter.

In the preferred practice, a carborane reactant such as carborane or methylcarborane preferably dissolved in an inert solvent such as dialkyl ether is treated (contacted with) an alkyllithium, which alkyllithium is also dissolved in an inert solvent, preferably a lower dialkylether under an inert atmosphere. The reaction mixture is heated, preferably to reflux temperature, for about 10 minutes or longer until the carboranyllithium intermediate is formed. The reaction mixture containing the carboranyllithium intermediate is cooled and added with stirring to a chilled, inert solvent solution of nitrosyl chloride. After the reaction between the intermediate and nitrosyl chloride is complete, approximately an hour, the reaction mixture containing the nitrosocarborane product is neutralized with a chilled aqueous alkali metal carbonate or hydroxide solution. The blue upper layer of the two phase system containing crude product is filtered, dried and freed to solvent. The purified product is produced by leaching with a petroleum fraction and chromatographing on a silica column.

To demonstrate the workings of this invention in its most detailed aspect, the following examples are submitted:

EXAMPLE 1

*Preparation of 1-methyl-2-nitrosocarborane*

Methylcarborane ($CH_3\theta H$, 7.9 g., 0.05 mole, M.P. 213–214°) in 150 ml. of dry ether under nitrogen was treated with 15% butyllithium in hexane (39 ml., cont. 4.1 g., 0.055 mole) during 15 minutes. After a further 15 minutes under reflux, the mixture was pumped into an addition funnel and set aside. Nitrosyl chloride (10 ml., 16 g., 0.25 mole) was condensed into a 500 ml. flask in a Dry-Ice/methanol bath and diluted with 50 ml. of dry ether. Then the methylcarboranyllithium solution was added during 70 minutes, with brisk magnetic stirring. When 10 minutes more stirring was accomplished, the entire contents of the vessel were poured into a mixture of 30 g. of sodium carbonate, 200 ml. of water, and 200 g. of ice, with brisk mechanical stirring. The upper blue layer was dried overnight with sodium sulfate, filtered and freed of solvent. The residue was leached with ligroin and chromatagraphed on 150 g. of silica, using ligroin, and collecting only the blue eluate, which after removal of solvent, comprised 2.0 g. (21%) of blue 1-methyl-2-nitrosocarborane, $CH_3\theta NO$, M.P. 210–212° (sealed tube).

EXAMPLE 2

*Preparation of 1-nitrosocarborane*

Carborane ($H\theta H$, 1.46 g., 0.01 mole, M.P. 188–189°) in 30 ml. of dry ether under nitrogen was cooled well in ice and treated with 15% butyllithium in hexane (7 ml., 0.01 mole) during 40 minutes, transferred to an addition funnel and set aside at room temperature for about 2 hours. Nitrosyl chloride (2 ml., 0.05 mole) was condensed into 1 ml. of ether, using Freon 14 in the cooling jacket of the reaction vessel to maintain $-125°$, and liquid nitrogen in a Dewar condenser to return the boiling Freon 14 to the cooling jacket. Ten milliliters of ether was added, then the carboranyllithium solution during 25 minutes. The workup was identical to that used above: 0.86 g. (49%) of blue 1-nitrosocarborane, M.P. 196.5–197.5° was obtained.

*Analysis.*—Calcd. for $C_2H_{11}B_{10}NO$: M.W., 173.12; C, 13.87; H, 6.40; B, 62.38%. Found: C, 13.60; H, 6.40; B, 62.00%.

As the above examples and the foregoing discussion indicate, numerous modifications can be made in the described reaction conditions without deviating from the substance of the inventive concept. For example, numerous inert solvents can be used to dissolve the carborane, alkyllithium and nitrosyl chloride reactants. These include the preferred alkyl or cyclic ethers, alkane-ether mixtures and the like. Illustrative specific solvents include diethyl ether, tetrahydrofurane, dipropyl ether, di-n-butyl ether, etc. Similarly, reaction times and temperatures are only approximate. For instance, while the formation of the alkylcarboranyllithium (or carboranyllithium) ordinarily takes place within about 30 minutes at reflux temperatures when diethyl ether is the inert solvent, the reaction can take place at lower or higher temperatures with correspondingly decreased or increased reaction times. The reaction temperature can be conveniently regulated by running the reaction at reflux in a lower or higher boiling inert solvent or solvent mixture. In this manner and by running the reaction at lower than reflux temperatures, the reaction can be run between about −20° to 60° C. The reaction conditions of the second step are similarly flexible; that is, higher or lower temperature than the preferred can be used. When lower temperatures are employed, the normal reaction time of about an hour is increased while, at higher temperatures, the reaction time is substantially shortened. Thus, the permissible reaction temperature can range from about −125° to +30° C. Further instances of permissible modifications in process conditions are the use of various neutralizing agents to remove acidity of the reaction product and the use of other procedures besides than chromatography to separate and purify the nitrosocarborane products. Where desired, fractional vacuum distillation, recrystallization and comparable procedures can be used. To best indicate the metes and bounds of this invention, the following claims are submitted.

We claim:

1. A process for preparing nitrosocarborane products selected from the group consisting of 1-loweralkyl-2-nitrosocarboranes and 1-nitrosocarborane comprising the steps of contacting in the presence of ether containing inert solvent, a carboranyllithium selected from the group consisting of carboranyllithium and loweralkylcarboranyllithium and nitrosyl chloride until substantial quantities of nitrosocarborane products are formed, and isolating the products contained therein.

2. An in situ process for preparing nitrosocarborane products selected from the group consisting of 1-loweralkyl-2-nitrosocarboranes and 1-nitrosocarborane comprising the steps of forming a reaction mixture of an alkyllithium, a carborane selected from the group consisting of carborane and loweralkylcarboranes, and ether, and contacting said reaction mixture with nitrosyl chloride, until a nitrosocarborane product is formed and isolating the product contained therein.

3. A process of preparing nitrosocarborane product selected from the group consisting of 1-loweralkyl-2-nitrosocarboranes and 1-nitrosocarborane comprising:
   (a) forming a reacton mixture of loweralkyllithium, and a carborane selected from the group consisting of carborane and loweralkylcarboranes, and dialkylether,
   (b) maintaining said reaction mixture between about −20 to 60° C. until a carboranyllithium intermediate selected from the group consisting of carboranyllithium and loweralkylcarboranyllithium is formed,
   (c) contacting said reaction mixture containing said carboranyllithium intermediate with nitrosyl chloride until the nitrosocarborane product is formed, and isolating said nitroso carborane product contained therein.

4. A process of preparing 1-nitrosocarborane product comprising:
   (a) forming a reaction mixture of carborane, loweralkyllithium and diethyl ether,
   (b) maintaining the reaction mixture between about −20° to 60° C. until the reaction mixture contains carboranyllithium,
   (c) contacting said reaction mixture containing carboranyllithium with nitrosyl chloride until the 1-nitrosocarborane product is formed, and isolating said product contained therein.

5. A process of preparing 1-loweralkyl-2-nitrosocarborane product comprising:
   (a) forming a reaction mixture of loweralkylcarborane, loweralkyllithium and diethyl ether,
   (b) heating the reaction mixture between about −20° to 60° C. until the reaction mixture contains loweralkylcarboranyllithium,
   (c) contacting said reaction mixture containing loweralkylcarboranyllithium with nitrosyl chloride until 1-loweralkyl-2-nitrosocarborane product is formed, and isolating said product contained therein.

6. A process of preparing 1-methyl-2-nitrosocarborane product comprising:
   (a) forming a reaction mixture of methylcarborane, loweralkyllithium and diethyl ether,
   (b) heating the reaction mixture between about −20° to 60° C. until the reaction mixture contains methylcarborane,
   (c) contacting said reaction mixture containing methylcarboranyllithium with nitrosyl chloride until 1-methyl-2-nitrosocarborane product is formed and isolating the product contained therein.

References Cited
UNITED STATES PATENTS

| | | | |
|---|---|---|---|
| 3,136,813 | 6/1964 | Boone et al. | 260—606.5 |
| 3,148,219 | 9/1964 | Ager et al. | 260—606.5 |

TOBIAS E. LEVOW, *Primary Examiner.*

W. F. W. BELLAMY, *Assistant Examiner.*